(12) United States Patent
Xu et al.

(10) Patent No.: US 10,143,135 B2
(45) Date of Patent: Dec. 4, 2018

(54) COMBINE HARVESTER CLEANING CONTROL AND CLEANING METHOD

(71) Applicant: JIANGSU UNIVERSITY, Jiangsu (CN)

(72) Inventors: Lizhang Xu, Jiangsu (CN); Yaoming Li, Jiangsu (CN); Zhenwei Liang, Jiangsu (CN); Zhong Tang, Jiangsu (CN)

(73) Assignee: JIANGSU UNIVERSITY (CN)

( * ) Notice: Subject to any disclaimer, the term of this patent is extended or adjusted under 35 U.S.C. 154(b) by 0 days.

(21) Appl. No.: 15/544,845

(22) PCT Filed: Mar. 17, 2015

(86) PCT No.: PCT/CN2015/074348
§ 371 (c)(1),
(2) Date: Jul. 19, 2017

(87) PCT Pub. No.: WO2016/138675
PCT Pub. Date: Sep. 9, 2016

(65) Prior Publication Data
US 2018/0027732 A1      Feb. 1, 2018

(30) Foreign Application Priority Data

Mar. 4, 2015   (CN) .......................... 2015 1 0095728

(51) Int. Cl.
*A01D 41/127* (2006.01)
*A01F 12/44* (2006.01)
(Continued)

(52) U.S. Cl.
CPC ..... *A01D 41/1276* (2013.01); *A01D 41/1277* (2013.01); *A01F 12/444* (2013.01);
(Continued)

(58) Field of Classification Search
CPC .............. A01D 41/127; A01D 41/1276; A01D 41/1273; A01D 41/1274; A01D 41/1277; B05B 13/021; A01F 12/52
(Continued)

(56) References Cited

U.S. PATENT DOCUMENTS

| 4,490,964 A | * | 1/1985 | Eldredge | ............ | A01D 41/1273 460/5 |
| 9,901,031 B2 | * | 2/2018 | Mott | .................. | A01D 41/1274 |

(Continued)

FOREIGN PATENT DOCUMENTS

| CN | 1839673 | 10/2006 | ............ | A01F 12/44 |
| CN | 201830680 | 5/2011 | ............ | A01F 12/54 |

(Continued)

OTHER PUBLICATIONS

International Search Report issued in corresponding PCT Patent Appln. No. PCT/CN2015/074348 dated Nov. 20, 2015, with English translation (6 pgs).

(Continued)

*Primary Examiner* — Arpad Fabian-Kovacs
(74) *Attorney, Agent, or Firm* — Hayes Soloway P.C.

(57) ABSTRACT

A combine harvester self-adaptive cleaning control apparatus, includes a return plate, a cleaning sieve, a cleaning centrifugal blower, an impurity collection and stirring auger, a grain collection and stirring auger, a cleaning grain loss monitoring sensor, a grain tank grain impurity rate automatic monitoring apparatus, and an on-line monitoring and control system. The on-line monitoring and control system is connected to the cleaning centrifugal blower, the cleaning grain loss monitoring sensor, the grain tank grain impurity rate automatic monitoring apparatus, and a power driving mechanism of a louver sieve having an adjustable opening. Also disclosed is a self-adaptive cleaning method of the (Continued)

cleaning apparatus which can automatically adjust various working parameters according to a working quality of a working process, control failure rate, and improve a downtime working time for the apparatus.

17 Claims, 7 Drawing Sheets

(51) Int. Cl.
    *A01F 12/46*     (2006.01)
    *A01F 12/48*     (2006.01)
    *A01F 12/56*     (2006.01)
    *H04N 5/372*     (2011.01)

(52) U.S. Cl.
    CPC ............ *A01F 12/448* (2013.01); *A01F 12/46* (2013.01); *A01F 12/48* (2013.01); *A01F 12/56* (2013.01); *H04N 5/372* (2013.01)

(58) Field of Classification Search
    USPC .......................................................... 701/50
    See application file for complete search history.

(56) References Cited

U.S. PATENT DOCUMENTS

| | | | | |
|---|---|---|---|---|
| 2003/0066277 A1* | 4/2003 | Behnke | ................ | A01D 41/127 56/10.2 R |
| 2005/0137003 A1* | 6/2005 | Behnke | .............. | A01D 41/1276 460/1 |
| 2005/0143153 A1* | 6/2005 | Behnke | .............. | A01D 41/1276 460/4 |
| 2006/0272307 A1* | 12/2006 | Behnke | ................ | A01D 41/127 56/10.2 R |
| 2008/0318648 A1* | 12/2008 | Baumgarten | ...... | A01D 41/1273 460/5 |
| 2010/0217481 A1* | 8/2010 | Baumgarten | ........ | A01D 41/127 701/33.4 |
| 2014/0019018 A1* | 1/2014 | Baumgarten | ........ | G05B 13/021 701/50 |
| 2015/0046043 A1* | 2/2015 | Bollin | ................... | B60W 50/08 701/50 |
| 2015/0293507 A1* | 10/2015 | Burns | .................... | G05B 15/02 700/83 |
| 2016/0081271 A1* | 3/2016 | Mott | .................. | A01D 41/1274 701/50 |

FOREIGN PATENT DOCUMENTS

| | | | | |
|---|---|---|---|---|
| CN | 102090207 | | 6/2011 | ........... A01D 41/127 |
| CN | 203661659 U | * | 6/2014 | ............. A01F 12/44 |
| CN | 106508257 A | * | 3/2017 | ........... A01D 41/127 |
| JP | 2002-262649 | | 9/2002 | ............. A01F 12/32 |
| JP | 2004065247 A | * | 3/2004 | ............. A01F 12/32 |
| JP | 2006-94767 | | 4/2006 | ............. A01F 12/32 |

OTHER PUBLICATIONS

Written Opinion issued in corresponding PCT Patent Appln. No. PCT/CN2015/074348 dated Nov. 9, 2015 (3 pgs).

\* cited by examiner

COMBINE HARVESTER CLEANING CONTROL AND CLEANING METHOD

TECHNICAL FIELD

The present invention relates to a cleaning system design and adaptive control of combine harvesters, and more particularly to a combine harvester with a multi-duct cleaning system and an adaptive cleaning method for a combine harvester.

BACKGROUND OF THE INVENTION

The cleaning system is the "digestive system" of the combine harvester, which is the core working section that significantly affects the quality, efficiency and adaptability of the entire apparatus. Most of the larger rice combine harvesters in China use a traditional wind-sieve cleaning system (single-channel centrifugal fan+double-layer vibrating screen). A single-channel centrifugal fan is used to produce clear air, using the difference in suspension velocity among grains, short straws, chaff and small amount of miscellaneous fines, etc.), combine with a double-layer vibrating weaving sieve or fish scale sieve to complete the separation of the grains and straws, and the miscellaneous fines, etc. As a practical matter traditional wind sieve cleaning section design is the main limiting factor to the development of large-scale rice combine harvesters in China. A specific manifestation is that the water content of high-yield super rice is high, and the floating rate of each component is staggered. It is difficult to quickly separate the grains, which seriously restricts the performance and efficiency of the cleaning system. The traditional cleaning system cannot adapt to improvements of crop varieties, and rapid increases in yield requirements.

Large and medium-sized combine harvesters such as the 988 STS (John Deere), the 2388 (CASE), the CR980 (New Holland) and the TUCANO 470 (CLAAS) have been developed in recent years, by John Deere, CASE, New Holland, CLAAS and other manufacturers. However, such large and medium-sized combine harvesters are mainly used for harvesting wheat, soybean, rape and other dry crops, since such large and medium-sized combine harvesters which may have a length of over 6-10 m, and a dead weight were about 8-10 tons cannot adapt to China's southern super-rice producing areas which typically are of 10-15 acres of plot size and present a deep mud angle operating environment. In addition, a conventional cleaning system using a double fan (or large diameter double duct fan), a pre-selected jitter plate (with a corrugated surface), a return conveyor plate (with a corrugated surface), a multi-layer screening screen and other composite structure, used with large and medium-sized combine harvesters cannot be applied to China's rice combine harvesters. So-called "half-size" combine harvesters made by Japanese and South Korean companies have their own limitations, cannot achieve large-scale, operational efficiency and harvest adaptability. Moreover, although Europe and the United States and other developed countries produce large-scale combine harvesters, their relevant test data, design theory and methods are maintained as trade secrets. In short, there is no relevant theory and method that can be used to guide the designing of China's large-scale feeding rice harvesters and its cleaning system, and because of the specific characteristics of the operating conditions in China, we cannot borrow foreign product design experience.

In addition, due to the significant differences in the working conditions of a combine harvester, operating conditions are ever-changing and the operating environment is extremely complicated, the performance of the cleaning system is significantly affected. The structure and motion parameters of the conventional cleaning system can only be carried out by manual adjustment, the working parameters cannot be adjusted based on the objects and the environment changes automatically to ensure top working performance, and harvesting adaptability is poor. To maximize performance, operating parameters need to be adjusted according to conditions to adjust for trends of technological development. For advanced combine harvesters, electronic information technology has been widely used, with joint harvesting function according to operational processes of the work automatically adjusting for various operating parameters, while improving the production efficiency, and controlling failure rate, while greatly improving the machine's trouble-free working hours. Compared with advanced combine harvesters of European and American multinational companies, China's grain combine harvesters are mostly equipped with only a small number of alarm devices, and general lack of working parameters and operating performance monitoring, working parameters such as electric/automatic adjustment and other intelligent monitoring device, result in machine operating performance being unstable, operating efficiency mainly depending on the skill level of the machine operator, and the handling of large, plug the fault frequently, the trouble-free working time less than one-fifth of foreign models, cannot meet the scale of China's rice production and rice oil (wheat) rotation area harvest and other operating requirements. In recent years, domestic and foreign scholars have done a lot of research work on intelligent technology of combine harvesters, but most of the research is only a research on the monitoring or prediction model of single working parameters and operating performance parameters, and not based on the current operation. Parameter value of the relevant parts of the feedback control and multi-operation parameters of the fusion control research is relatively small.

In addition, the relevant intelligent technology research towards the cleaning system performance monitoring focuses only on the grain loss monitoring, without taking into account another important performance indicator-namely grain impurity ratio. Therefore, the performance of the grain impurity ratio monitoring device is an important factor to achieve adaptive control of the cleaning system, and a literature search found that there has not yet been seen a publication about this problem so far in China.

SUMMARY OF THE INVENTION

To achieve the above object, the present invention provides a combine harvester adaptive cleaning control apparatus and an adaptive cleaning control method.

The present invention is achieved by the following technical means: A combine harvester has an adaptive cleaning system, comprising a return plate, a sieve, a miscellaneous auger, a grain auger, a grain loss monitoring sensor centrifugal fan, and a grain impurity ratio monitoring system. The grain loss monitoring sensor is located at the tail of the sieve, the return plate and the miscellaneous auger are located on the underside of the tail of the vibrating screen, and the grains collection tank are collected with the grain auger flush with the bottom of the centrifugal fan. The centrifugal fan is located on the underside of the sieve, and the front side of the cleaning centrifugal fan is flush with the front side of the sieve. The sieve comprises an upper jitter plate, a lower jitter plate, an adjustable opening chaff, an upper vibrating screen, and a serrated tail sieve, a lower vibrating screen drive shaft, a lower vibrating screen, a lower vibrating screen driving hydraulic motor. The upper jitter plate is located on the front side of the adjustable scale sieve. The adjustable scale chaff is located on the front side of the upper vibrating screen, the serrated tail sieve is located on the tail of upper vibrating screen, and the power driver of adjustable scale sieve is locates in the tail of sieve. The lower shaker driving hydraulic motor is installed in the sieve, and the vibrating screen drive shaft is connected to the lower vibrating screen driving hydraulic motor by means of a coupling (2014) and a lower vibrating screen drive shaft.

The combine harvester further comprises of an on-line monitoring and control system. The input of the on-line monitoring and control system and grain loss monitoring sensor, the lower vibrating screen driving hydraulic motor, and the output of the on-line monitoring and control system are connected to the power drive mechanism of an adjustable scale fish scale sieve, a cleaning centrifugal fan is connected for controlling the opening degree of a fish tail sieve and the air intake and outlet direction of a cleaning centrifugal fan.

In one embodiment of the invention the combine harvester includes an adaptive cleaning device having a fish tail opening adjusting mechanism which comprises a connecting piece, the first connecting rod, a direction changing element, a second link, a connecting plate, a direct current electric cylinder, a linear displacement sensor, a support plate, a first connecting pin, a supporting shall and a second connecting pin. The support plate is mounted on a side plate below the serrated tail sieve of the cleaning screen, and includes a support shaft fixed at one end to the left of support plate. A direction switch is fixed to the left side of the support plate by fasteners at one end of the support shaft on the side plate below the zigzag tail curtain, and the direction switch is connected to the first link through a first connecting pin, and a direction switching means is connected to the first connecting rod which is connected to the second link through a second connecting pin, and the other end of the second link is mounted with a rod end bearing. The connecting pin connects the rod end bearing of the second link to the rod end bearing on the extension shall of a DC electric cylinder, and the DC electric cylinder is mounted on the support is mounted on the inside of the DC motor cylinder on the support plate and is parallel to the DC motor cylinder. A straight line displacement sensor (205-7) is connected with the output shaft of the DC electric cylinder (205-6) through the connecting plate, and the rectangular plate is welded at the lower edge of the adjustable scale sieve. The first link passes through the serrated tail sieve in the clear screen and is connected to a rectangular hole beneath the fish tail screen by fasteners. The DC electric cylinder is connected with the on-line monitoring and control system through a signal line. The on-line monitoring and control system senses the driving direction and controls the movement of the DC electric cylinder. The first connecting rod movement completes the adjustment opening of fish tail sieve.

In one embodiment of the combine harvester adaptive cleaning control apparatus of the invention the cleaning centrifugal fan comprises a fan inlet opening adjustment mechanism, a fan blade drive, a lower outlet, a sub-wind plate I and a first angle adjusting mechanism, a sub-wind plate II, and a second angle adjusting mechanism. The upper outlet is on the upper part of the upper vibrating screen, the lower outlet is composed of a sub-wind plate I and the first angle adjusting mechanism, and the sub-wind plate II, the sub-wind plate I and the first angle adjusting mechanism pass through the center of the upper vibrating screen, the sub-wind plate II and the second angle adjusting mechanism which extends in a line intersecting the tail of the lower vibrating screen, the fan inlet opening adjusting mechanism, and the fan blade drive mechanism. The angle adjustment mechanism and the second angle adjustment mechanism are connected to the output of the on-line monitoring and control system, respectively.

In another embodiment of the combine harvester adaptive cleaning system of the present invention, the fan blade drive mechanism comprises a hydraulic motor, a hydraulic motor mounting plate, fan blades, a fan shaft and a bearing seat. The fan blades are uniformly mounted on the fan shaft (502-5), the fan shaft is mounted on the frame through the bearing seat at both ends, and the hydraulic motor mounting plate is bolted to the frame and the hydraulic motor. The center line of the output shaft of the hydraulic motor coincides with the center line of the fan shaft, and the fan shaft is connected with an extension shaft of the hydraulic motor. The signal line of the hydraulic motor is connected with the on-line monitoring and control system, and the on-line monitoring and control system.

In another embodiment the combine harvester adaptive cleaning system of the present invention the fan inlet opening adjustment mechanism comprises a DC electric push rod, a upper connecting hole of a half moon plate, a half-moon shield plate, and a lower connecting hole of a half moon plate. The DC electric push rod is mounted on the side wall of the upper outlet. The half-moon shield plate accommodates the DC electric push rod though an upper connecting hole of the half moon plate; the half-moon shield plate connects the outer wall of the blower outlet of the fan by the lower connecting hole of the half moon plate; the DC electric push rod is connected to the on-line monitoring and control system via a signal line, and movement of the shaft is controlled by controlling the movement of the DC electric push rod around the half-moon shield plate connection hole (501-4) rotation to control the fan air inlet air volume.

In another embodiment of the combine harvester adaptive cleaning system of the present invention, the first angle adjusting mechanism comprises a lifting ear I, a stepping motor, a rotating rod, a sub-fan I, a chute, a hanging ear II, and a stepping motor support frame. The stepping motor is mounted on the wall by a stepping motor support frame, and one end of the rotary lever, the lifting lug I is fixed to the output shaft of the stepping motor, and the crankshaft and the other end of the rotary rod are connected to the hanging ear II via a circular slide rail, and the stepping motor. A line is connected to the on-line monitoring and control system, and the stepping motor produces forward or reverse rotation under the control of the on-line monitoring and control system, thereby driving the sub-wind plate I to achieve the adjustment of the angle of the wind plate I.

In another embodiment the combine harvester adaptive cleaning system of the present invention, the second angle adjusting mechanism comprises a lifting ear I, a stepping motor, chute 1, a chute 2, a lifting lug 2, a stepping motor support frame, a wind turbine, and a stepping motor mounted on the wall by a stepping motor support frame. At one end of the rotary lever is fixed the output shaft of the stepping motor on the output shaft of the intake motor, and the crankshaft. The other end of the slide bar and the rotary lever is connected to the lifting lug 2 via a circular guide, and the stepping motor. A line is connected to the on-line monitoring and control system, and the stepping motor produces forward or reverse rotation under the control of the on-line monitoring and control system, thereby driving the sub-wind plate II To achieve the adjustment of the angle of wind plate II.

In another embodiment of the combine harvester adaptive cleaning system of the present invention the joint harvester grain box grain includes a rate automatic monitoring means comprising a grain extraction means, a transport mechanism, a machine vision section and a processor. The grain extraction mechanism includes a guide groove, a bracket a sampling drum, a hopper, a DC stepping motor, a coupling, and a connecting frame. A hopper is located on the bottom surface of guide groove, and a sampling drum is supported by a bracket located within the hopper and the surface of the sampling roller and has at least one groove which is tangent to the rectangular hole when rotated, and one end of the sampling roller is connected to the DC stepping motor (618) through a coupling;

The grain transfer mechanism comprises at least a conveyor platform carrying a grain sample, and a transmission means capable of transporting the grain to the transport platform.

The machine vision system comprises a support plate, a light box, a light source and a visible light CCD camera. The support plate is welded to the bracket, the support plate having a vertical plate perpendicular to the conveyor platform. A gap is provided between the lower edge of the vertical plate and the conveyor platform which is slightly greater than the height of the harvested grain of the harvester, the visible light CCD camera being located in the light box. The processor comprises a current controller, a DC stepper motor control is connected with the image preprocessing unit, the light source is connected with the current controller, and the image is connected with the image preprocessing unit. The light source is connected with the image preprocessing unit, and the preprocessing unit is used for converting the image to be measured photographed by the visible CCD camera into a binary image for dividing the residual feature image into a binary image and extracting the spurious Morphological and color characteristics and separating the miscellaneous grains from the grains, the miscellaneous count units being used to count the fathals in the image. The conveyor platform of the grain transfer mechanism is a feed table, which comprises a plate spring, a core coil, an armature, a base, and a feeding platform. The feeding platform is fixed to the base by a plate spring which is fixed to the lower surface of the base and the feed table, respectively, The coil is connected to the current controller and is fixed under the tail of the conveyor platform; and the grain extraction mechanism further comprises a warehouse wall exciter provided on the bottom surface of the hopper, the width of the hopper corresponds with the width of the feed table.

The processor is connected to the on-line monitoring and control system via a signal line.

In one embodiment of the combine harvester adaptive cleaning system of the present invention, the distance between dither plate and upper vibrating screen is in the range of 0.050~0.10 m, the tail of the jitter plate and upper vibrating screen is located on the upper side of the lower vibrating screen by 0.10 m to 0.15 m, the outer width of the upper vibrating screen and the lower vibrating screen is 1.2~1.5 m, and the length of the return plate is 0.8~1.5 m, the width is 1.0~1.5 mm.

Also provided is a method for adaptive selection using a combine harvester adaptive cleaning control system, comprising of the following steps:

S1: In the operation of a joint harvesting machine, on-line monitoring of the first wind plate I tilt angle, the second outlet wind plate II angle, fan speed, fan vibration frequency, fish tail sieve opening, and grain removal loss rate, grain box grain containing rate to characterize the multi-channel adaptive cleaning device operating status;

S2: multi-channel adaptive cleaning system operating status on-line monitoring of abnormal data on the monitoring data replacement, missing data padding, data pretreatment to eliminate random, and uncertain factors on the follow-up data of the impact of analysis;

S3: the on-line monitoring of the first wind board I tilt, the second outlet wind plate II tilt, fan speed, fan inlet opening, time series of the parameters of the sieve, frequency of the fish tail, and the rate of grain removal, wherein the time series of the grains in the grain box are considered as the associated variables. Based on the monitoring data preprocessing, a forecast validity is used as a evaluation criterion of prediction accuracy. Time series correlation coefficients of the performance parameters of the multivariate cleaning device are determined by a chaotic phase space reconstruction method, and the reconstructed dimensions of the time series samples are combine with a gray correlation cluster analysis. Using a Gaussian process regression model, an optimal reconstruction dimension of the time series samples of the performance parameters of the cleaning device is determined dynamically.

S4: A time series of the performance parameters of the cleaning system is decomposed into a superposition of intrinsic instantaneous function (IMF) components by a empirical mode decomposition (EMD) using a Hilbert-Huang transform (HHT), and instantaneous characteristics of the time series of the performance parameters of the cleaning system are used to establish an adaptive prediction model of the performance parameters of the cleaning system.

S5: A predictive value of the adaptive prediction model is selected as a sample input, and the variable fitting residual is used as a sample output. The adaptive prediction model of the performance parameters of the cleaning system is obtained by a multi-core support vector regression machine (MSVR) fitting residuals for regression analysis, and further correction of the predicted value;

S6: Multi-channel adaptive cleaning system operating status online monitoring and control system (7), through the multi-core support vector regression machine (MSVR) model of the revised selection of the performance parameters of the parameters of the input value for the input variable, applying Fuzzy control theory, real-time output of the corresponding control signal on the multi-channel adaptive cleaning system to select the centrifugal wind (5) under the outlet of the first wind plate I tilt angle, the second outlet outlet wind plate II angle, fan speed, fan (2) the vibration frequency of the sieve (2) and the actuating element of each regulating mechanism of the fish tail opening, and real-time adjustment of working parameters of the multi-channel adaptive cleaning system is completed so that the multi-channel performance parameters of the adaptive cleaning system are distributed within a reasonable range.

The Beneficial Effects of the Present Invention are:

(1) The invention reduces the number of core components of a feed rice combine harvester, reduces operating performance bottleneck, and increases efficiency and adaptability for harvest. The present invention automatically adjust various operating parameters during operation, and improve product efficiency. At the same time failure rate will be reduced while time between failures improved. (2) The apparatus of the present may be adapted for handling rice, wheat, canola, soybeans and other crops which cleaning systems may be used in advancement of the harvest machinery industry and provide theoretical, technical and logistical support for China's food security.

DETAILED DESCRIPTION OF THE INVENTION

Below in conjunction with the accompanying drawings and specific embodiments of the present invention will be further described, but the scope of the present invention is not limited thereto.

Figure 1:
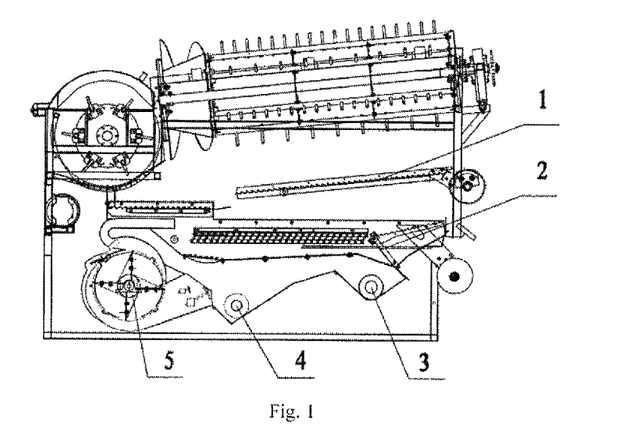
FIG. 1 is a combine harvester windy road cleaning apparatus main view.

As FIG. 1 shown, a multi-channel self-adaptive cleaning apparatus comprises a return plate 1, a sieve 2, a tailing collecting auger 3, a grain auger 4, a centrifugal fan 5, a grain impurity ratio monitoring device 6 and multi-channel self-adaptive cleaning apparatus online monitoring with line monitoring and control system 7. Return plate 1 is located up the sieve 2, tailing collecting auger 3 is located on the underside of the tail of the sieve 2. Grain auger 4 is behind the ¼ length of sieve 2 and equals the bottom of centrifugal fan 5. The grains tank are collected with the grain auger 4 and the bottom of the centrifugal fan 5 is flush. Centrifugal fan 5 is located on the underside of the sieve 2. The front side of the cleaning centrifugal fan 5 is flush with the front side of the sieve 2. Grain impurity ratio monitoring devices 6 is mounted on the outlet of grain auger 4. The length of grain cleaning equipment is 0.8~1.5 m, the width of it is 1.0~1.5 mm, the height of it is 0.6~0.8 m. The length of return plate is 0.8~1.5 m and the width of it is 1.0~1.5 mm.

Figure 2:
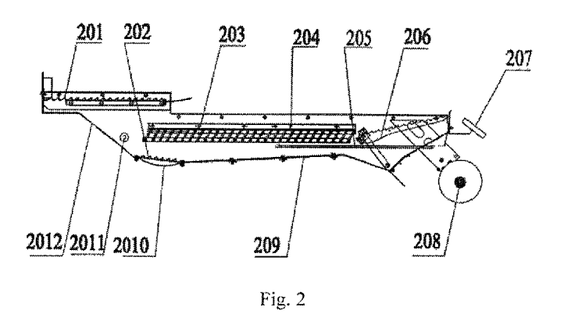
FIG. 2 is a combine harvester windy road cleaning means cleaning the main screen view.
Figure 3:
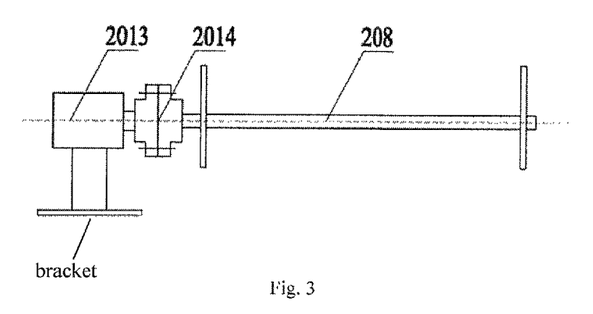
FIG. 3 is a cleaning sieve vibration frequency adjustment mechanism left side view.

As FIG. 2 and FIG. 3 show the sieve 2 comprises an upper jitter plate 201, a under jitter plate 202, an adjustable sieve scale 203, an upper vibrating screen 204, a serrated tail sieve 206, a shaker drive shaft 208, a the lower shaker 209, a curved wind deflector 2010, a jitter panel driver bearing 2011, and an air inlet 2012. The upper jitter plate 201 is located on the front side of the adjustable sieve scale 203. The adjustable scale sieve 203 is located on the front side of the upper vibrating screen 204. The serrated tail sieve 206 is located on the tail of upper vibration screen 204. Sieve opening scale adjustment mechanism 205 is between vibration sieve 204 and the lower shaker 209. Power drive mechanism of sieve opening scale adjustment mechanism 205 is placed on the tail of sieve 2. Curved wind deflector 2010 is behind vibration sieve 204 and connects with the front of lower shaker 209. The front of curved wind deflector 2010 aligns with the front of upper vibration sieve 204 in the horizontal direction. Air inlet 2012 is between upper jitter plate 201 and vibration sieve 204. Air inlet 2012 is in front of upper vibration sieve 204. The extending line of air inlet 2012 and upper vibration sieve 204 are parallel. Jitter panel driver bearing 2011 connects with upper jitter plate 201. Shaker drive shaft 208 is on the rear outside of sieve 2 and connects with the lower shaker 209. Under shaker drive hydraulic motor 2013 is mounted on the rear outside of sieve 2 and fixed on the bracket of cleaning room. Vibrating screen drive shaft 208 is connected with under shaker drive hydraulic motor 2013 by coupling 2014. Cleaning grain loss monitoring sensors 207 is on the tail of sieve 2. Lower shaker 209 has a weaving structure. The length of sieve 2 is 2.0 m~2.5 m, the width is 1.2 m~1.5 m and the height is 0.6 m~0.8 m. The distance between upper jitter plate 201 and vibration sieve 204 is 0.050 m~0.10 m. The length of tail of upper jitter plate 201 and upper vibrating screen 204 overlap is 0.5~0.8 m. The vibration sieve 204 is located on the upper side of the lower vibrating screen 209 by 0.10 m to 0.15 m, and the outer width of the upper vibrating screen 204 and the lower vibrating screen 209 is 1.2~1.5 m.

Figure 4:
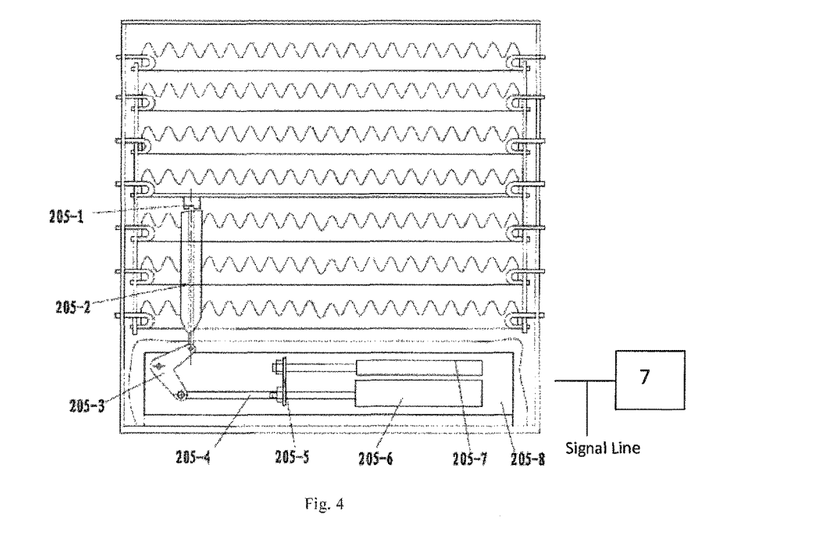
FIG. 4 is a clear scale sieve opening adjustment device schematic.
Figure 5:
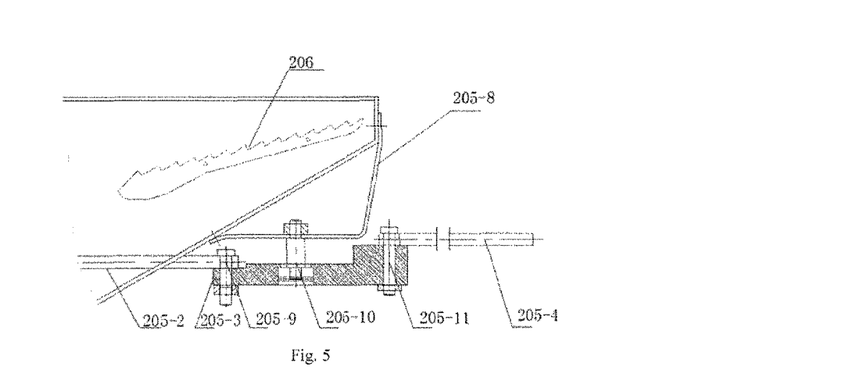
FIG. 5 is a clear scale sieve opening adjustment device is mounted position in the main view.
Figure 6:
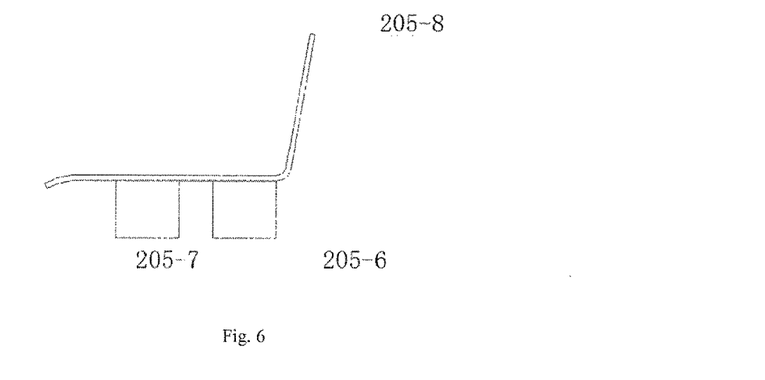
FIG. 6 is a DC electric cylinders and linear displacement transducer relative position in the main view.

As FIG. 4, FIG. 5 and FIG. 6 shown, sieve opening scale adjustment mechanism 205 comprises a connecting piece 205-1, a first link 205-2, a direction changing element 205-3, a second link 205-4, a connecting plate 205-5, a DC electric cylinder 205-6, a linear displacement sensor 205-7, a support plate 205-8, a first connecting pin 205-9, a supporting shaft 205-10 and a second connecting pin 205-11. The support plate 205-8 is mounted on a side plate below the serrated tail sieve 206 of the cleaning screen 2. The support shaft 205-10 is fixed on the left of support plate 205-8. Direction switch 205-3 is fixed by fasteners at one end of the support shaft 205-10. The direction changing member 205-3 is connected to the first link 205-2 through a first connecting pin 205-9 and is connected to the second link 205-4 through a second connecting pin 205-11. The other end of the second link 205-4 is mounted with a rod end bearing. The connecting pin connects the rod end bearing of the second link 205-4 to the rod end bearing on the extension shaft of the DC electric cylinder 205-6. The DC electric cylinder 205-6 is mounted on the support plate 205-8 parallel to the DC motor cylinder 205-6. The output shaft of the displacement sensor 205-7 is connected with the output shaft of the DC electric cylinder 205-6 through the connecting plate 205-5, and the rectangular plate is welded at the lower edge of the adjustable scale sieve 203. The first link 205-2 passes through the serrated tail sieve 206 in the sieve 2 and is connected to the rectangular hole beneath the fish scale screen 205-1 by fasteners. The DC electric cylinder 205-6 is connected with the on-line monitoring and control system 7 through a signal line. The on-line monitoring and control system 7 realizes the driving direction changing member by controlling the movement of the DC electric cylinder 205-6. The first connecting rod 205-3 movement completes the adjustment opening of fish tail sieve.

Figure 7:
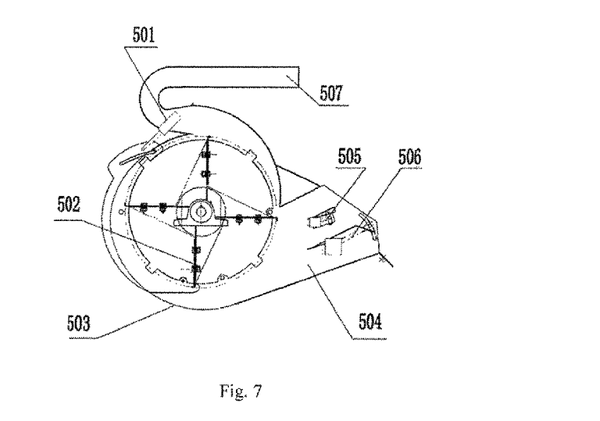
FIG. 7 is a windy road cleaning fan front view.

As FIG. 7 shows, cleaning centrifugal fan 5 comprises a fan inlet opening adjustment mechanism 501, a volute 503, a lower outlet 504, a sub-wind plate I and a first angle adjusting mechanism 505, a sub-wind plate II, a second angle adjusting mechanism 506 and upper outlet 507. The upper outlet 507 is on the upper part of the upper vibrating screen 209. The lower outlet 504 is composed of a sub-wind plate I and the first angle adjusting mechanism 505 and a sub-wind plate II 506. The sub-wind plate I and the first angle adjusting mechanism 505 pass through the center of the upper vibrating screen 204. The sub-wind plate II and the second angle adjust in a mechanism 506 extending line intersecting the tail of the lower vibrating screen 209.

Figure 8:
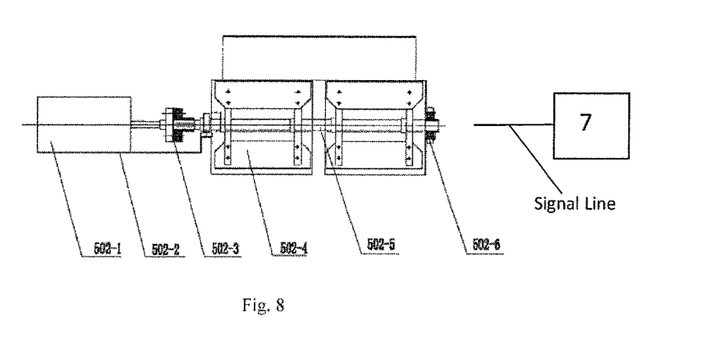
FIG. 8 is a cleaning centrifugal fan drive left view.

As FIG. 8 shows, fan blade drive mechanism comprises a hydraulic motor 502-1, a hydraulic motor mounting plate 502-2, fan blades 502-4, a fan shaft 502-5 and a bearing seat 502-6. The fan blades 502-4 are uniformly mounted on the fan shaft 502-5. The fan shaft 502-5 is mounted on the frame through the hearing seat 502-6 at both ends. The hydraulic motor mounting plate 502-2 is bolted to the frame. The center line of the output shaft of the hydraulic motor 502-1 coincides with the center line of the fan shaft 502-5, and the fan shaft 502-5 is connected with the extension shaft of the hydraulic motor 502-1. A signal line of the hydraulic motor 502-1 is connected with the on-line monitoring and control system 7 which includes a multi-channel self-adaptive line monitoring and control system. The controller of hydraulic motor 502-1 drives the related execution parts of hydraulic motor 502-1 to control the motor rotating speed so that the rotating speed of centrifugal fan 5 can be controlled.

Figure 9:
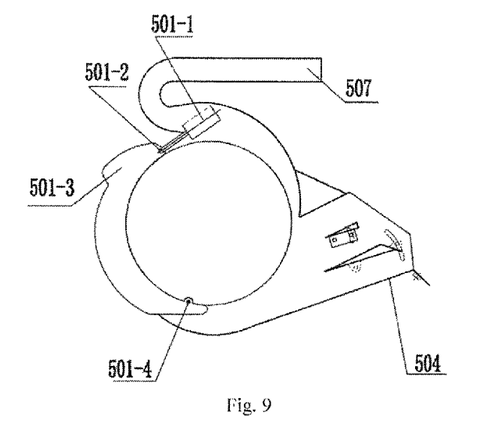
FIG. 9 is cleaning the fan inlet opening adjustment mechanism front view.

As FIG. 9 shows, fan inlet opening adjustment mechanism comprises a DC electric push rod 501-1, the upper connecting hole of the half moon plate 501-2, a half-moon shield plate 501-3, and a lower connecting hole of the half moon plate 501-4. The DC electric push rod 501-1 is mounted on the side wall of the upper outlet 507. The half-moon shield plate 501-3 connects the DC electric push rod 501-1 though the upper connecting hole of the half moon plate 501-2. The half-moon shield plate 501-3 connects outer wall of the blower outlet 504 of the fan by the lower connecting hole of the half moon plate 501-4. Fan inlet opening adjustment mechanism 501-1 connects with multi-channel self-adaptive cleaning apparatus working, surrounding line monitoring and control system 7 by signal lines. When the machine is working, movement of the shaft is controlled by controlling the movement of the DC electric push rod 501-1 around the half-moon shield plate connection hole 501-4 rotation to control the fan air inlet air volume.

Figure 10:
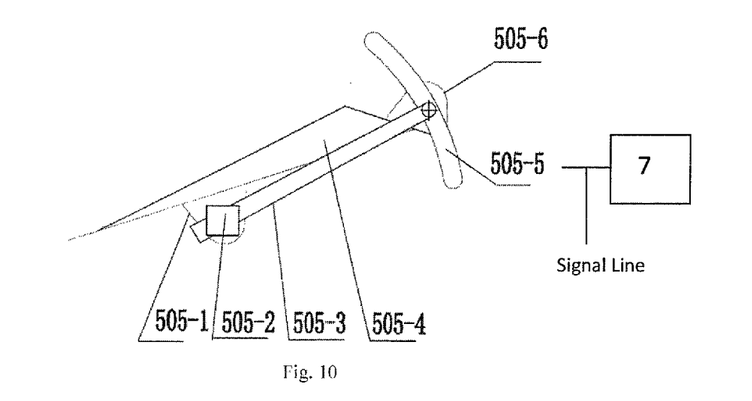
FIG. 10 is a divider plate I front view angle adjustment mechanism.
Figure 11:
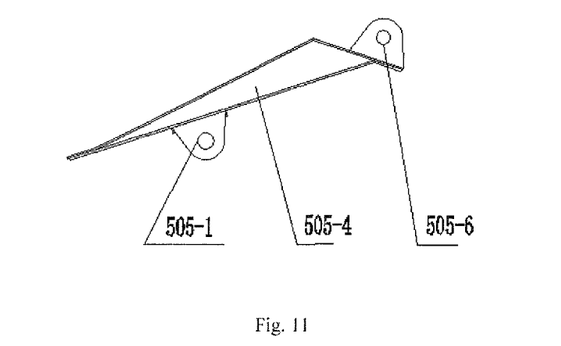
FIG. 11 is a front view of the air board I.
Figure 12:
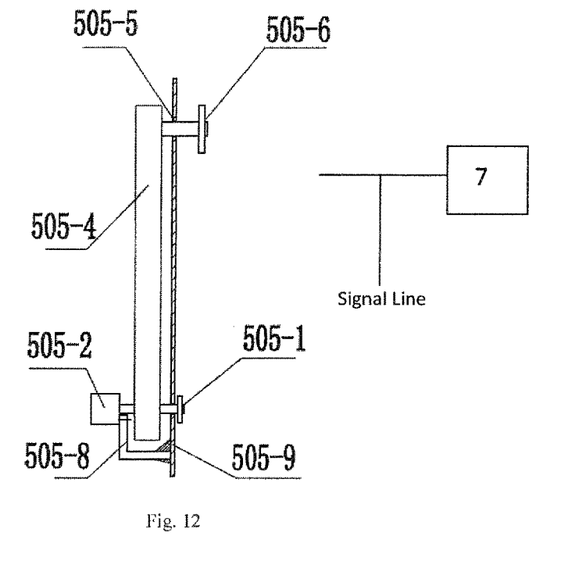
FIG. 12 is a divider plate I left view angle adjustment mechanism.

As FIG. 10, FIG. 11 and FIG. 12 show, a first angle adjusting mechanism 505 comprises a lifting ear I 505-1, a stepping motor 505-2, a rotating rod 505-3, a sub-fan I 505-4, a chute 505-5, a hanging car II 505-6, and a stepping motor support frame 505-8. The stepping motor 505-2 is mounted on the wall 505-8 by a stepping motor support frame 505-7, and one end of the rotary lever 505-3, the lifting lug I 505-1 is fixed to the output shaft of the stepping motor 505-2, and the crankshaft 505-5, and the other end of the rotary rod 505-3 is connected to the hanging ear II 505-6 via a circular slide rail 505-5, and the stepping motor 505-2. A line is connected to the on-line monitoring and control system 7, and the stepping motor 505-2 achieves forward or reverse rotation under the control of the on-line monitoring and control system 7, thereby driving the sub-wind plate I 505-4 to achieve the adjustment of the angle of the wind plate I 505-4.

Figure 13:
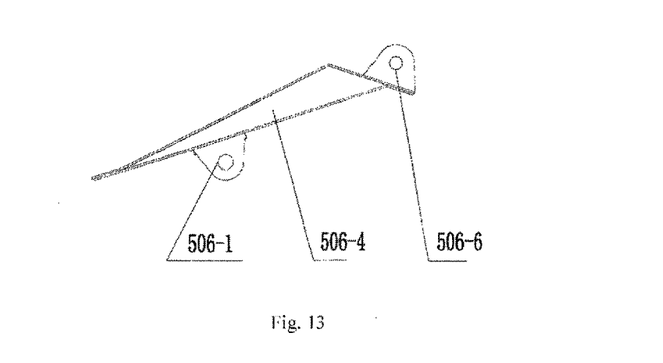
FIG. 13 is a divider plate II front view angle adjustment mechanism.
Figure 14:
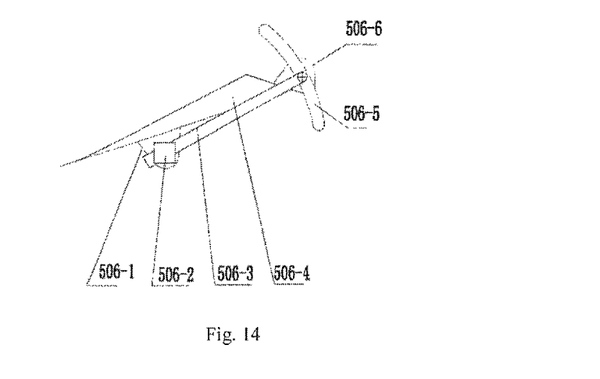
FIG. 14 is a front view of the air board II.
Figure 15:
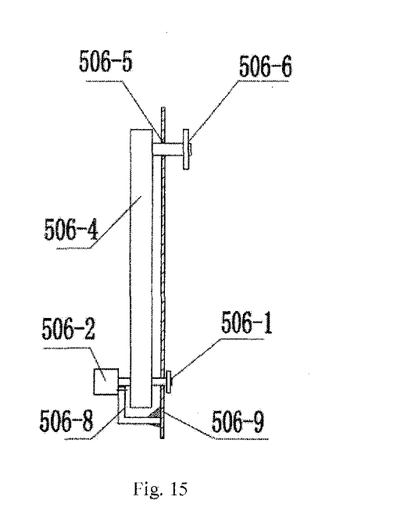
FIG. 15 is a divider plate II left view angle adjustment mechanism.

As FIG. 13. FIG. 14 and FIG. 15 shown, a second angle adjusting mechanism 506 comprises a lifting ear I 506-1, a stepping motor 506-2, a rotating plate 506-3, a chute 506-4, a chute 506-5, a lifting lug 2 506-6, a stepping motor support frame 506-7 and a wind turbine 506-8. The stepping motor 506-2 is mounted on the wall 506-8 by a stepping motor support frame 506-7, and one end of the rotary lever 506-3 is fixed to the output shaft of the stepping motor 506-2 and the crankshaft 506-8. The output shaft of stepping motor 506-2 is fixed on lug 1506-1. The other end of the slide bar 506-5 and the rotary lever 506-3 is connected to the lifting lug 2 506-6 by a circular guide 506-5, and the stepping motor 506-2. A line is connected to the on-line monitoring and control system 7. The stepping motor 506-2 achieves forward or reverse rotation under the control of the on-line monitoring and control system 7 thereby driving the sub-wind plate II 506-4 to achieve the adjustment of the angle of the wind plate II 506-4.

Figure 16:
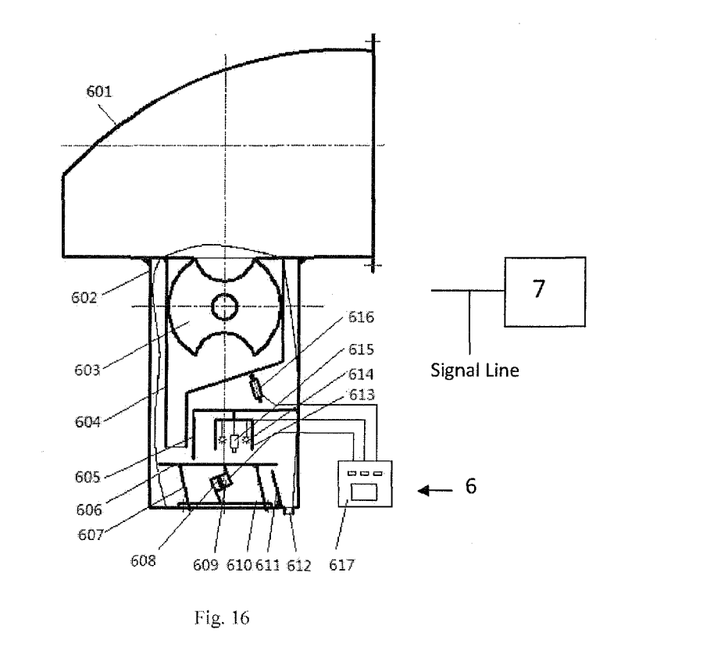
FIG. 16 is a combine harvester grain tank Grain impurity rate automatic monitoring devices left side view.
Figure 17:
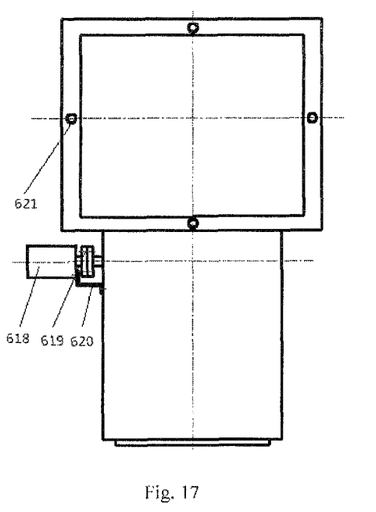
FIG. 17 is a combine harvester grain tank Grain impurity rate automatic monitoring devices front view.

As FIG. 16 and FIG. 17 shown, joint harvester grain box grain containing rate automatic monitoring means 6 comprises a grain extraction means, a transport mechanism, a machine vision section and a processor 617. The grain extraction mechanism includes a guide groove 601, a bracket 602, a sampling drum 603, a hopper 604, a DC stepping motor 18, a coupling 19, and a connecting frame 20. A hopper 604 is located on the bottom surface of guide groove 601. A sampling drum 603 is supported by a bracket 602 located within the hopper 604 and the surface of the sampling roller 603 has at least one groove 603 which is tangent to the rectangular hole when rotated, and one end of the sampling roller 603 is connected to the DC stepping motor 618 through a coupling 619. The outlet of hopper 604 is on one side. A warehouse wall vibrator 616 is set on the outside of hopper 604. The warehouse wall vibrator 616 vibrates the bottom of hopper 604 to cause materials from hopper 604 to slide smoothly. A conveyor platform of the grain transfer mechanism is a feed table or platform 606, which comprises a plate spring 607, a core coil 608, an armature 609 and a base 610. The feeding platform 606 is fixed to the base 610 by a plate spring 607. A core-coil sheet 608 and armature base 609 are fixed to the lower surface of the base 610 and the feed table 606 respectively. Baffles 611 are fixed under the tail of the conveyor platform, and the sample is diverted. In order to prevent the material from scattering, it is preferable that the width of the hopper 604 coincides with the width of the feeding stations 606. The machine vision part is composed of a support plate 605, a light box 613, a light source 614 and a visible light CCD camera 615. The light box 613 is suspended from the support plate 605 and is on the top of transport platform. The support plate 605 is welded to the bracket 602. The support plate 605 has a vertical plate perpendicular to the conveyor platform, with a gap between the lower edge of the vertical plate and the conveyor platform being slightly greater than the height of the harvested grain of the harvester. The visible light CCD camera 615 is located in the light box 613. The processor 617 comprises a current controller, a DC stepping motor controller, an image preprocessing unit, an image segmentation unit, a mismatch counting unit. Visible light CCD camera 615 and processor 617 are connected with multi-channel adaptive cleaning device operating status on-line monitoring and control system 7 by signal lines. The core-coil sheet 608 is connected to a current controller embedded in the control core coil 608 in the processor via a signal line.

Frequency of the iron core coil 608 and the armature 609 is controlled by controlling the current on and off in the coil. So, the transmission speed of the grain sample on the grain transfer mechanism is controlled. The warehouse wall vibrator 616 is provided on the outside of the bottom surface of the hopper 604 and is connected to the current controller. The light source 614 is connected to a current controller, and the visible light CCD camera 615 is connected to the image preprocessing unit via a data line. The image preprocessing unit is used for converting the image to be measured photographed by the visible CCD camera 615 into a binary image. The image segmentation unit is used for dividing the residual feature image in the binary image, extracting morphological and color features of the miscellaneous matter and separating miscellaneous grains from grain. A hash count unit is used to count mismatches in the images.

Adaptive selection using a combine harvester adaptive cleaning control device, comprises the following steps:

(1) The grain extraction mechanism use DC stepper motor controller and DC stepper motor 18 drive drum samples 603. The grooves on the sampling drum 603 are scraped off the effluent from the food container of the combine harvester. The scraped material is conveyed through the hopper 604 to the conveying platform of the grain transfer mechanism, driven by the DC stepping motor 18.

(2) The visible light CCD camera 615 acquires the mismatched sample image sequence in real time and feeds it into the processor 617 when the transport platform is moved into the visible area of the visible light CCD camera 615.

(3) The image preprocessing unit converts the image to be measured into a gray scale image and performs mean filtering and median filtering. A Hough transform is used to remove the edge image and contrast enhancement to further remove noise and enhance the image turning a degree image into a binary image.

(4) The image segmentation unit divides mismatched feature images by a distance transformation minima combination method and a watershed algorithm extracts residual morphological features and color characteristics and separates the miscellaneous grains from the grains by a morphological method.

(5) The mismatch counting unit counts mismatches in the image using a method of "performing eight neighborhood edge traces on the mismatched region and then filling pixels inside the connected region", and then calculating mismatches in the current detection sample content.

The working process of using self-adaptive cleaning apparatus to make self-adaptive clean is:

Firstly, mount the grain loss monitoring sensor on the trail of the sieve bracket. Based on a mathematic relationship between the grain size of the selected grain and the distribution of grain in different areas of the sieve tail, the grain removal rate of the current multi-channel cleaning device is monitored in real time. Then, once the scrapings of the sampling drum fall onto the inclined wall of the hopper, with a continuous turning of DC stepper motor the scraping material reaches the upper side of the grain transfer mechanism with constant vibration of the wall-wall exciter.

The grain extraction mechanism of grain impurity ratio monitoring devices use the DC stepper motor to drive drum samples turning. The grooves on the sampling drum are scraped off of effluent from the food container of the combine harvester.

Secondly, the grain transfer mechanism controls the grain sample to be conveyed at a constant speed past the machine vision part of the set lighting condition. The visible light CCD camera takes miscellaneous samples of black and white image sequence in real-time and sends the images into the computer when grain samples run past the visible light CCD camera. The images taken by the CCD camera are processed by the mean filter, the median filter, image sharpening, contrast enhancement and other pre-processing to further remove noise, and enhance the images in the processor.

Thirdly, a Hough transform is used to detect the circle to remove the edge image for subsequent counting, and then combine with a watershed algorithm to separate the residual feature images to extract morphological and color characteristics of the images and separate the grains by morphological methods. Mismatches in the sample can be calculated by counting mismatches in the image using the method of "performing the eight neighborhood edge tracking on the mismatched region and then filling the pixels inside the connected region". After the image collection of the light box is finished, the discharge falling from the feeding table is guided by the baffle and discharged through the discharge port. The DC stepping motor is rotated in a semi-circle under control of the computer and automatically enters the next sampling cycle in order to obtain real-time grain rate of grain box.

Fourthly, multi-channel adaptive cleaning device operating status on-line monitoring and control system receive working parameters (the wind fan angle of under the outlet belonging to clear centrifugal fan, the wind fan angle of under the outlet, fan speed, fan inlet opening, clear sieve vibration frequency, fish scale sieve opening) and performance parameters (grain cleaning loss grate miscellaneous rate of grain from grain box) and display the status of multi-channel adaptive cleaning device operating status.

Lastly, multi-channel adaptive cleaning device operating status on-line monitoring and control system has features of abnormal data substitution, missing data padding, data denoising to eliminate the influence of random and uncertain factors on subsequent data analysis. Then, the working parameters and performance parameters time series is treated as an associated variable. Based on the monitoring data preprocessing, a prediction validity is used as the evaluation criterion of the prediction accuracy. Time series correlation coefficients of the performance parameters of the multivariate cleaning device are determined by a chaotic phase space reconstruction method and the reconstructed dimensions of the time series samples are combine with the gray correlation cluster analysis. Using a Gaussian process regression model, an optimal reconstruction dimension of the time series samples of the performance parameters of the cleaning device is determined dynamically. Time series of the performance parameters of the cleaning device is decomposed into the superposition of the intrinsic instantaneous function (IMF) components by empirical mode decomposition (EMD) using a Hilbert-Huang transform (HHT), and instantaneous characteristics of the time series of the performance parameters of the cleaning device are used to establish an adaptive prediction model of the performance parameters of the cleaning device.

The predictive value of the adaptive prediction model is selected as the sample input, and the variable fitting residual is used as the sample output. The adaptive prediction model of the performance parameters of the cleaning device is obtained by the multi-core support vector regression machine (MSVR), for fitting residuals for regression analysis, and further correction of the predicted value.

With the multi-channel adaptive cleaning device operating status online monitoring and control system of the present invention, through a multi-core support vector regression machine (MSVR) model of the revised selection of the performance parameters of the parameters of the input value for the input variable, the application Fuzzy control theory, real-time output of the corresponding control signal on the multi-channel adaptive cleaning device to select the centrifugal wind under the outlet of the wind plate I tilt angle, the next outlet wind plate II angle, fan speed, fan inlet opening, the vibration frequency of the sieve and the actuating element of each regulating mechanism of the fish scale opening, and real-time adjustment of the working parameters of the multi-channel adaptive cleaning device is achieved. The performance parameters of the adaptive cleaning device are produced within a reasonable range.

The embodiments are preferred embodiments of the present invention, but the invention is not limited to the embodiments described above, and any obvious improvement, substitution, or modification can be made by a person skilled in the art without departing from the spirit of the invention[. Variations are within the scope of the present invention.

LIST OF ELEMENTS 1 return plate
2—sieve
3—tailing collecting auger
4 grain auger
5—centrifugal fan
6—grain impurity ratio monitoring device
7—line monitor and control system
201—plate jitter
202—jitter plate
203—sieve scale
204—vibration sieve
205—sieve opening scale adjustment mechanism
206—serrated tail screen
207—cleaning grain loss monitoring sensor
208—shaker drive shalt
209—under the shaker
2010—curved wind deflector
2011—jitter panel driver bearing
2012—air inlet
2013—under shaker drive hydraulic motor
2014—coupling
205-1—connecting plate
205-2—first link
205-3—direction changing member
205-4—second link
205-5—webs
205-6—DC electric cylinder, linear displacement
205-7—sensor support plate
205-8—support plate
205-9—first connecting pin
205-10—support shaft
205-11—second connector pin
501—fan inlet opening adjustment mechanism
502—fan blades a
503—drive mechanism, volute
504—under outlet
505—air board angle adjustment mechanism I
506—air board angle adjustment mechanism II
507—outlet
501-1—DC electric putter
501-2—half-moon plate connecting hole
501-3—half moon wind deflector shield
501-4—lower connecting hole of wind shield plate
502-1—hydraulic motor
502-2—mounting plate
502-3—coupling
502-4—fan blades
502-5—fan shaft
502-6—bearing
505-1—lifting ear I
505-2—stepping motor
505-3 rotating lever
505-4—divider plate II
505-5—slide
505-6—lug 2
505-7—stepping motor support bracket
505-8 cleaning machine wall fan
506-1—lug I
506-2—stepping motor
506-3—rotating rod
506-4—divider plate
506-5—slide
506-6—lug II
506-7—stepping motor support bracket
506-8—fan wall
601—diversion channel
602—bracket
603—drum samples
604—hopper
605—the support plate
606—feeding stations
607—plate spring
608—core-coil sheet
609—armature base
610—base
611—baffles
612—discharge port
613 light boxes
614—light
615—visible light CCD camera
616—warehouse wall vibrator
617—processor
618—DC stepper motor
619—coupling
620—connecting frame
621—the mounting hole

The invention claimed is:
1. A combine harvester comprising:
a sieve;
a collecting auger,
a grain auger;
a grain cleaning system;
a grain hopper;
a grain loss monitoring sensor;
a centrifugal fan; and
a grain impurity ratio monitoring device, wherein:
the grain loss monitoring sensor, an outlet plate and the collecting auger are located at a tail of the sieve;
the sieve includes an adjustable tail, and comprises an upper jitter plate, a lower jitter plate, an upper vibrating screen, and a lower vibrating screen including a lower vibrating screen diving motor, wherein the upper jitter plate is located on the upper vibrating screen, and the sieve includes a serrated tail which is located on a tail of the upper vibrating screen;
a power drive mechanism for the sieve adjustable tail is located at the tail of sieve;
a lower shaker driving motor is connected to drive the sieve; and a lower vibrating screen drive shaft is connected to the lower vibrating screen driving motor, wherein:

the combine harvester further comprises an on-line monitoring and control system, wherein an input of the on-line monitoring and control system, the grain loss monitoring sensor, and the lower vibrating screen driving motor, and an output of the on-line monitoring and control system is connected to the power drive mechanism for controlling the sieve adjustable tail, and to the centrifugal fan for controlling a degree of opening of the sieve adjustable tail and an air intake and an outlet direction of the centrifugal fan.

2. The combine harvester of claim 1, wherein the sieve adjustable tail includes an opening adjusting mechanism which comprises a first connecting rod, a direction changing element, a second link, a connecting plate, a direct current electric cylinder, a linear displacement sensor, a support plate, a first connecting pin, a supporting shaft, and a second connecting pin, wherein the support plate is mounted on a side plate below the sieve serrated tail;

the support shaft has one end fixed to one side of the support plate;

a direction switch is fixed to one side of the support plate by fasteners at one end of the support shaft on the side plate below a zigzag tail curtain;

a direction switch is connected to the first link through the first connecting pin;

the direction changing element is connected to the first connecting rod which in turn is connected to one end of the second link through the second connecting pin;

the other end of the second link is mounted with a rod end bearing;

wherein the connecting pin connects the rod end bearing of the second link to a rod end bearing on the extension shaft of a DC electric cylinder;

a DC electric cylinder is mounted on a support which in turn is mounted on an inside of the DC motor cylinder on the support plate, parallel to the DC motor cylinder, and an output shaft of a displacement sensor;

the output shaft of the displacement sensor is connected with an output shaft of the DC electric cylinder through the connecting plate;

the rectangular plate is welded at a lower edge of the adjustable tail sieve;

the first link passes through the tail sieve of the sieve and is connected to the rectangular hole beneath the adjustable tail sieve by fasteners; and the DC electric cylinder is connected with the on-line monitoring and control system through a signal line, wherein the on-line monitoring and control system controls a driving direction by controlling movement of the DC electric cylinder and movement of the first connecting rod to adjust the opening of the sieve adjustable tail.

3. The combine harvester of claim 1, wherein the centrifugal fan comprises:

a fan inlet opening adjustment mechanism;

a fan blade drive;

a lower outlet;

a first sub-wind plate and a first angle adjusting mechanism; and a second sub-wind plate and a second angle adjusting mechanism; wherein an upper outlet is on an upper part of the upper vibrating screen, the lower outlet is comprised of the first sub-wind plate and the first angle adjusting mechanism, and the second sub-wind plate;

the first sub-wind plate and the first angle adjusting mechanism pass through a center of the upper vibrating screen;

the second sub-wind plate and the second angle adjusting mechanism extend in an imaginary line intersecting the tail of the lower vibrating screen, the fan inlet opening adjusting mechanism, and the fan blade drive mechanism; and the angle adjustment mechanism and the second angle adjustment mechanism are connected to the output of the on-line monitoring and control system, respectively.

4. The combine harvester of claim 3, wherein the fan comprises a hydraulic motor, a hydraulic motor mounting plate, fan blades, a fan shaft and a bearing seat;

the fan blades are uniformly mounted on the fan shaft;

the fan shaft is mounted on the frame through the bearing seat;

the hydraulic motor mounting plate is bolted to the frame, and to the hydraulic motor; wherein a center line of the output shaft of the hydraulic motor coincides with a center line of the fan shaft, and the signal line of the hydraulic motor is connected with the on-line monitoring and control system.

5. The combine harvester of claim 3, wherein the fan inlet opening adjustment mechanism comprises a DC electric push rod; and a half-moon shield plate hanging an upper connecting hole; and a lower connecting hole;

a DC electric push rod is mounted on a side wall of the upper outlet;

the half-moon shield plate connects the DC electric push rod though the upper connecting hole and also connects an outer wall of the blower outlet of the fan through the lower connecting hole; and the DC electric push rod is connected to the on-line monitoring and control system via a signal line; and movement of the shaft is controlled by controlling movement of the DC electric push rod through the half-moon shield plate upper connecting hole rotation to control fan air inlet air volume.

6. The combine harvester of claim 5, wherein the first angle adjusting mechanism comprises a first lifting ear; a stepping motor; a rotating rod; a first sub-fan; a chute; a second hanging ear; and a stepping motor support frame;

wherein the stepping motor is mounted on the wall by a stepping motor support frame, and one end of a rotary lever; wherein the first lifting lug is fixed to the output shaft of the stepping motor, and the crankshaft and the other end of the rotary rod are connected to the second hanging ear via a circular slide rail, and the stepping motor;

wherein the line is connected to the on-line monitoring and control system; and the stepping motor produces forward or reverse rotation under control of the on-line monitoring and control system thereby driving the first sub-wind plate to achieve adjustment of an angle of the first wind plate.

7. The combine harvester of claim 5, wherein the second angle adjusting mechanism comprises a first lifting ear; a stepping motor; a rotating plate; first and second chutes; a second lifting lug; a stepping motor support frame; and a wind turbine;

wherein the stepping motor is mounted on the wall by a stepping motor support frame, and one end of the rotary lever is fixed to the output shaft of the stepping motor; and the other end of the slide bar and the rotary lever is connected to the second lifting lug via a circular guide, and the stepping motor; and wherein the line is connected to the on-line monitoring and control system and the stepping motor produces forward or reverse rotation under control of the on-line monitoring and control system thereby driving the second sub-wind plate to adjust an angle of the second wind plate.

8. The combine harvester of claim 1, wherein the grain impurity ratio monitoring device comprises: a grain extraction mechanism; a transport mechanism; a machine vision section and a processor;

wherein the grain extraction mechanism includes a guide groove, a bracket, a sampling drum, a hopper, a DC stepping motor, a coupling, and a connecting frame;

wherein the hopper is located aligned with the guide groove, the sampling drum is supported by a bracket located within the hopper, and a surface of the sampling roller has at least one groove which is tangent to the rectangular hole when rotated, and one end of the sampling roller is connected to the DC stepping motor through a coupling;

the grain transfer mechanism comprises at least a conveyor platform carrying a grain sample and a transmission capable of transporting the food product to the transport platform;

the machine vision section is comprised of a support plate, a light box, a light source, a processor and a visible light CCD camera;

the support plate is welded to the bracket, the support plate having a vertical plate perpendicular to the conveyor platform, with a gap between the lower edge of the vertical plate and the conveyor platform being slightly greater than a height of the harvested grain of the harvester; and the visible light CCD camera being located in the light box;

the processor comprises a current controller a DC stepper motor control is connected with the image preprocessing unit; the light source is connected with the current controller, the image is connected with the image preprocessing unit; and the light source is connected with the image preprocessing unit;

the on-line monitoring and control system includes a processor adapted for converting images taken by the visible CCD camera into binary images for extracting spurious Morphological and color characteristics, and for separating miscellaneous grains and counting grains in the images;

the conveyor platform of the grain transfer mechanism is a feed table, which comprises a plate spring, a core coil, an armature, a base and a feeding platform, wherein, the feeding platform is fixed to a base by a plate spring which is fixed to a lower surface of the base and the feed table, respectively;

a coil is connected to a current controller which is fixed under a tail of the conveyor platform;

the grain extraction mechanism further comprises a grain hopper wall exciter provided on a bottom surface of the grain hopper, and the width of the grain hopper coincides with a width of the feed table; and the processor is connected to the on-line monitoring and control system via a signal line.

9. The combine harvester of claim 1, wherein a distance between the jitter plate and the upper vibrating screen is in the range of 0.050~0.10 m;

the tail of the jitter plate and upper vibrating screen is located on an upper side of the lower vibrating screen by 0.10 m to 0.15 m; and an outer width of the upper vibrating screen and the lower vibrating screen is 1.2~1.5 m a length of the return plate is 0.8~1.5 m, wherein the width is 1.0~1.5 mm.

10. The combine harvester of claim 2, wherein the centrifugal fan comprises:

a fan inlet opening adjustment mechanism;

a fan blade drive;

a lower outlet;

a first sub-wind plate and a first angle adjusting mechanism; and a second sub-wind plate and a second angle adjusting mechanism; wherein an upper outlet is on an upper part of the upper vibrating screen, a lower outlet is comprised of a first sub-wind plate, the first angle adjusting mechanism, and a second sub-wind plate;

the first sub-wind plate and the first angle adjusting mechanism pass through the center of the upper vibrating screen;

the second sub-wind plate and the second angle adjusting mechanism extend in an imaginary line intersecting the tail of the lower vibrating screen, the fan inlet opening adjusting mechanism, and the fan blade drive mechanism; and the angle adjustment mechanism and the second angle adjustment mechanism are connected to the output of the on-line monitoring and control system, respectively.

11. The combine harvester of claim 10, wherein the fan blade drive mechanism comprises a hydraulic motor, a hydraulic motor mounting plate, a fan shaft and a bearing seat;

the fan blades are uniformly mounted on the fan shaft;

the fan shaft is mounted on the frame through the bearing seat at both ends;

the hydraulic motor mounting plate is bolted to the frame and to the hydraulic motor; wherein a center line of the output shaft of the hydraulic motor coincides with a center line of the fan shaft, and the fan shaft and is connected with an extension shaft of the hydraulic motor; and the signal line of the hydraulic motor is connected with the on-line monitoring and control system.

12. The combine harvester of claim 10, wherein the fan inlet opening adjustment mechanism comprises a DC electric push rod, an upper connecting hole of a half moon plate, a half-moon shield plate, and a lower connecting hole of a half moon plate;

the DC electric push rod is mounted on the side wall of the upper outlet;

the half-moon shield plate connects the DC electric push rod though the upper connecting hole of the half moon plate and also connects an outer wall of the blower outlet of the fan by the lower connecting hole of the half moon plate;

the DC electric push rod is connected to the on-line monitoring and control system via a signal line; and movement of the shaft is controlled by controlling the movement of the DC electric push rod around the half-moon shield plate connection hole rotation to control the fan air inlet air volume.

13. The combine harvester of claim 10, wherein the first angle adjusting mechanism comprises a first lifting ear, a stepping motor, a rotating rod, a first sub-fan, a chute, a second hanging ear, and a stepping motor support frame;

wherein the stepping motor is mounted on the wall by a stepping motor support frame, and one end of a rotary lever; wherein the first lifting lug is fixed to the output shaft of the stepping motor, and the crankshaft and the other end of the rotary rod are connected to the second hanging ear via a circular slide rail, and the stepping motor;

wherein the signal line is connected to the on-line monitoring and control system; and the stepping motor produces forward or reverse rotation under control of the on-line monitoring and control system thereby driving the first sub-wind plate achieve adjustment of an angle of the first wind plate.

14. The combine harvester of claim 10, wherein the second angle adjusting mechanism comprises a first lifting ear, a stepping motor, a rotating plate, first and second chutes, a second lifting lug, a stepping motor support frame, and a wind turbine;

wherein the stepping motor is mounted on the wall by a stepping motor support frame, and one end of the rotary lever is fixed to the output shaft of the stepping motor on the output shaft of the intake motor, and the crankshaft; and the other end of the slide bar and the rotary lever is connected to the second lifting lug via a circular guide, and the stepping motor; and wherein the line is connected to the on-line monitoring and control system, and the stepping motor produces forward or reverse rotation under control of the on-line monitoring and control system whereby to drive the second sub-wind plate to adjust an angle of the second wind plate.

15. The combine harvester of claim 2, wherein the grain impurity ratio monitoring device comprises: a grain extraction mechanism, a transport mechanism, a machine vision section, and a processor;

wherein the grain extraction mechanism includes a guide groove, a bracket, a sampling drum, a hopper, a DC stepping motor, a coupling, and a connecting frame;

wherein the hopper is located on a bottom surface of a guide groove, the sampling drum is supported by a bracket located within the hopper, and a surface of the sampling roller has at least one groove which is tangent to the rectangular hole when rotated, and one end of the sampling roller is connected to the DC stepping motor;

the grain transfer mechanism comprises at least a conveyor platform carrying a grain sample and a transmission capable of transporting the grain to the transport platform;

the machine vision section is composed of a support plate, a light box, a light source, a processor and a visible light CCD camera;

the support plate is welded to the bracket, the support plate having a vertical plate perpendicular to the conveyor platform, with a gap between the lower edge of the vertical plate and the conveyor platform being slightly greater than a height of the grain; the visible light CCD camera being located in the light box; wherein the processor is connected to a current controller; a DC stepper motor control is connected with the image preprocessing unit; the light source is connected with the current controller, the visible light CCD camera is connected with the image preprocessing unit, and the light source is connected with the image preprocessing unit;

a preprocessing unit is adapted for converting the image from the visible CCD camera into a binary image for dividing residual feature images into the binary images and extracting spurious Morphological and color characteristics and separating the miscellaneous grains from the grains, the collecting count units being used to count the grains in the images;

the conveyor platform of the grain transfer mechanism is a feed table, which comprises a plate spring, a core coil, an armature, a base and a feeding platform, wherein, the feeding platform is fixed to a base by a plate spring which is fixed to the lower surface of the base and the feed table, respectively;

a coil is connected to a current controller which is fixed under the tail of the conveyor platform;

the grain extraction mechanism further comprises a grain hopper wall exciter provided on a bottom surface of the grain hopper, and the width of the grain hopper coincides with the width of the feed table; and the processor is connected to the on-line monitoring and control system via a signal line.

16. The combine harvester of claim 2, wherein a distance between the dither plate and the upper vibrating screen is in the range of 0.050~0.10 m;

the tail of the jitter plate and upper vibrating screen is located spaced from an upper side of the lower vibrating screen by 0.10 m to 0.15 m; and an outer width of the upper vibrating screen and the lower vibrating screen is 1.2~1.5 m a length of the return plate is 0.8~1.5 m, wherein the width is 1.0~1.5 mm.

17. A method for operating a combine harvester of claim 1, the steps of:

during operation of a combine harvester, on-line monitoring and controlling the combine harvester using real-time access to control the centrifugal fan and outlet wind plate angle, determining fan speed and fan vibration frequency, adjustable tail sieve opening, grain removal loss rate, and grain tank grain containing rate to characterize a multi-channel adaptive cleaning device operating status;

determining a multi-channel adaptive cleaning device operating status by on-line monitoring for control system abnormal data of monitoring data, missing data padding, pretreating data to eliminate random, and uncertain factors in follow-up data;

employing the on-line monitoring and control system in real-time access to control the centrifugal fan, the first wind board tilt, the second outlet wind plate tilt, fan speed, fan inlet opening, time series measurement parameter of the sieve, frequency of the sieve adjustable tail, rate of grain removal, and time series measurement of grains in the grain hopper taking as variables and based on monitoring data preprocessing, determining performance parameters of the cleaning device using a chaotic phase space reconstruction method, and reconstructing dimensions of time series samples combined with a gray correlation cluster analysis; using a Gaussian process regression model, optimal reconstruction dimension of the time series samples of the performance parameters of the cleaning system is determined dynamically;

breaking a time series of the performance parameters of the cleaning device into a superposition of intrinsic instantaneous function (IMF) components by an empirical mode decomposition (EMD) using a Hilbert-Huang transform (HHT); employing instantaneous characteristics of the time series of the performance parameters of the cleaning device to establish the adaptive prediction model of the performance parameters of the cleaning device;

selecting a predictive value of the adaptive prediction model as a sample input, and using a variable fitting residual as the sample output; an adaptive prediction model of the performance parameters of the cleaning device is obtained by a multi-core support vector regression machine (MSVR) fitting residuals for regression analysis, and further correction of the predicted value; and determining multi-channel adaptive cleaning device operating status, through a multi-core support vector regression machine (MSVR) model of the revised selection of the performance parameters of the parameters of the input value for the input variable, application or Fuzzy control theory, and real-time output of the corresponding control signal on the multi-channel adaptive cleaning device to select taking into account the first wind plate tilt angle, the second outlet wind plate angle fan speed, vibration frequency of the sieve adjustable tail and the actuating element of each regulating mechanism of the adjustable tail sieve opening, effecting a real-time adjustment of the working parameters of the cleaning device so that the multi-performance parameters of the cleaning device are achieved.

* * * * *